United States Patent [19]

Cherukuri et al.

[11] 4,271,198
[45] Jun. 2, 1981

[54] CHEWING GUM HAVING A SOFT TEXTURE

[75] Inventors: Subraman R. Cherukuri; Dominick R. Friello, both of Danbury, Conn.; Walter Jewell, Mamaroneck; Donald A. M. Mackay, Pleasantville, both of N.Y.

[73] Assignee: Life Savers, Inc., New York, N.Y.

[21] Appl. No.: 102,069

[22] Filed: Dec. 10, 1979

[51] Int. Cl.³ ............................................. A23G 3/30
[52] U.S. Cl. ......................................... 426/3; 426/5
[58] Field of Search ...................................... 426/3-6

[56] References Cited

U.S. PATENT DOCUMENTS

| | | | |
|---|---|---|---|
| 1,711,281 | 4/1929 | Mowrey | 426/3 |
| 2,301,331 | 11/1942 | Schantz | 426/3 |
| 3,262,784 | 7/1966 | Bucher | 426/3 |
| 3,352,689 | 11/1967 | Bilotti | 426/3 |
| 3,795,744 | 3/1974 | Ogawa et al. | 426/3 |
| 3,851,073 | 11/1974 | Cook | 426/3 |
| 3,974,293 | 8/1976 | Witzel | 426/4 |
| 3,982,023 | 9/1976 | Bahoshy | 426/3 |
| 4,000,320 | 12/1976 | Klose et al. | 426/3 |
| 4,157,401 | 6/1979 | Stroz | 426/4 |
| 4,161,544 | 7/1979 | Kaul | 426/3 |

*Primary Examiner*—Jeanette M. Hunter
*Attorney, Agent, or Firm*—Lawrence S. Levinson; Burton Rodney

[57] ABSTRACT

A chewing gum is provided which initially has a relatively hard texture making it easy to wrap and which subsequently changes to a relatively soft texture facilitating easy bite through. The above chewing gum includes gum base, corn syrup, solids and one or more liquid moisturizers initially separated from the corn syrup solids, together with optional sweeteners and bulking agents, softeners and the like.

A method for preparing the above chewing gum is also provided.

11 Claims, No Drawings

CHEWING GUM HAVING A SOFT TEXTURE

FIELD OF THE INVENTION

The present invention relates to a chewing gum which initially has a rather hard texture to facilitate wrapping thereof, which hard texture subsequently converts to a relatively soft texture for an easy chew and flavor release.

BACKGROUND OF THE INVENTION

Chewing gums generally include gum base, water-soluble sweeteners and flavoring. The water-soluble sweeteners usually include sucrose, dextrose, corn syrup (in liquid form as a gum base plasticizer), and/or sorbitol liquid and/or sorbitol powder, or combinations thereof. The chewing gum is generally prepared by melting the gum base, mixing corn syrup or liquid sweetener for 3 to 5 minutes with the gum base followed by the addition of solid sweetener (for example, sugar) and flavor and mixing for 5 minutes. The chewing gum is removed from the kettle, rolled and cut to the desired shape.

In the above chewing gum, the corn syrup (which provides a substantial portion of the moisture in the gum) will be retained in the gum base as part of the oil or insoluble phase and the sucrose and/or other sweeteners will be incorporated in a water-soluble phase which is in simple admixture with the oil phase and might even be considered to be coated on the gum base. The result is that the gum base will protect the corn syrup as an internal phase thereby minimizing the amount of corn syrup on the surface of the gum (surface corn syrup causes the gum to sweat). However, due to the equilibrium relative humidity of the chewing gum, there is eventual migration of moisture from the corn syrup to the gum surface causing the gum base to be plasticized and the chewing gum to become soft and sticky so that it sticks to its wrapper. Futhermore, there is a subsequent loss of moisture through evaporation at the gum surface at equilibrium relative humidities below that of the gum. Reduction in moisture content of chewing gum leads to loss of flexibility which manifests itself in increased stiffness and brittleness. The latter phenomena is, of course, associated with stale or old chewing gum.

Thus, in summary, due to the moisture provided by liquid corn syrup, fresh chewing gum initially has a soft sticky consistency so that it tends to stick to its wrapper. After standing, for example, for several months, the chewing gum loses moisture as described above, becomes hard and less sticky and thus becomes stale. If the above sequence of events could be reversed so that fresh chewing gum has a relatively hard consistency and only after being wrapped becomes soft, the initial unwrapping problems and subsequent shelf-life problems could be very much alleviated.

DESCRIPTION OF THE INVENTION

In accordance with the present invention, a chewing gum is provided which essentially overcomes the above-mentioned wrapper and storage problems associated with most chewing gums. The chewing gum of the invention initially has a relatively hard texture or consistency so that it may be wrapped without having the wrapper stick to individual pieces, and after being wrapped, changes to a chewing gum having a relatively soft texture to provide a good chew and easy bite through.

The chewing gum of the invention does not initially contain liquid corn syrup but employs in its place corn syrup solids and one or more liquid moisturizers, such as, sorbitol liquid, which liquid moisturizers are, at least initially, substantially isolated from the corn syrup solids in the final chewing gum product. It has been found that because at first the corn syrup is in solid form and has not picked up moisture, it does not initially plasticize the gum base. Thus, the fresh chewing gum has a non-sticky relatively hard consistency which makes it easy to wrap without it sticking to the wrapper. Within 12 or more hours after the chewing gum has been wrapped, it is believed that the corn syrup solids pick up moisture from the sorbitol liquid or other liquid moisturizer and/or other liquids present in the chewing gum causing the chewing gum to soften due to slight plasticizing of the gum base.

Thus the chewing gum of the invention will include gum base, corn syrup solids, sugar and/or other bulking agents and/or other sugar alcohols, and/or sweeteners, flavor, softeners, one or more liquid moisturizers, such as sorbitol liquid, and, optionally, colors.

In addition, in accordance with the present invention, a method for producing chewing gum which initially has a relatively hard consistency which subsequently changes to a relatively soft consistency is provided, which method includes the steps of admixing a portion of sweetener-bulking agent, such as sugar, with melted gum base causing the melted gum base to break up into distinct granules or masses of gum base containing the sweetener-bulking agent, mixing the granules or masses with corn syrup solids, which functions to increase granular formation and later as a binder, mixing the above mixture with the remainder of the sweetener-bulking agent and also with flavor, the mixing being continued until a fine granular aerated discontinuous mass is formed, and mixing the discontinuous mass with liquid moisturizer which acts as a binder to form a cohesive mass of chewing gum having a relatively hard consistency. The chewing gum may be rolled and cut into the desired shape and individually wrapped without the chewing gum pieces sticking to the wrappers.

Within about 12 hours, liquid from the liquid moisturizer, such as sorbitol syrup, or other liquids present in the chewing gum is absorbed by the corn syrup solids causing the gum to soften and to some extent be plasticized. The final wrapped chewing gum product is a soft cohesive, but not actually continuous, mass having a soft chew and easy bite through.

The corn syrup solids which function as a binder will generally have a dextrose equivalent of from about 20 to about 95, and preferably from about 20 to about 42 and will comprise corn syrup dried to a moisture content of less than about 4% by weight. The corn syrup solids will be present in an amount of from about 2 to about 15%, and preferably from about 4 to about 12% by weight of the chewing gum.

The liquid moisturizers suitable for use herein should be less hygroscopic than the corn syrup solids so that the corn syrup solids attract water to a greater degree than the liquid moisturizers. Thus, the corn syrup solids will absorb water from the liquid moisturizers and provide the eventual softening or plasticizing effect required. Accordingly, in essence, the present invention provides chewing gum wherein water is in a form which is temporarily segregated from the corn syrup solids until after packaging is completed.

The liquid moisturizer will generally comprise from about 65 to about 75% by weight solids, with the remainder being water. The liquid moisturizer will be present in the chewing gum product in an amount of from about 5 to about 25%, and preferably from about 8 to about 16% by weight of the chewing gum.

Examples of liquid moisturizers suitable for use herein include sorbitol liquid, glycerin, high fructose corn syrup, invert syrup, sugar syrup, water, or mixture of two or more of such moisturizers. It will also be appreciated that the liquid moisturizers may comprise slurries of encapsulated water and/or sweetening agents and/or plasticizers, as well as any of the above mentioned liquid moisturizers.

As indicated, the chewing gum may include a sugar in an amount of from about 30 to about 80% by weight, and preferably, from about 45 to about 70% by weight. Where another sugar alcohol, in addition to the sorbitol liquid, such as sorbitol solids, and/or mannitol or xylitol, is employed, the sugar alcohol may be present in an amount within the range of from about 2 to about 15% by weight, and preferably, from about 5 to about 12% by weight. Where an artificial sweetener is employed such as, for example, aspartame, cyclamate, or a saccharin or other sweetener as set out hereinafter, the artificial sweetener may be present in an amount of from about 0 to about 0.5% by weight, and preferably, from about 0.05 to about 0.2% by weight.

Examples of sugars which may be employed herein include, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose such as cane or beet sugar, lactose, maltose or cellobiose; polysaccharides, such as partially hydrolyzed starch or dextrin.

Examples of artificial sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum will include a relatively water-insoluble, water-impenetrable gum base in an amount ranging from about 8 to about 50%, and preferably from about 15 to 40% by weight of the chewing gum composition. The gum base employed may be bubble gum base or non-bubble gum base.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutyleneisoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils which may also be employed in the chewing gum of the invention include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

The chewing gum may also contain conventional ester gums, polydextrose, fillers, such as calcium carbonate, and talc and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.&C. coloring agents, and other conventional chewing gum additives as will be apparent to those skilled in the art.

In carrying out the method of the invention, the gum base is first melted; thereafter the melted gum base is cooled to below about 200° F., and preferably below about 180° F., and softener, such as lecithin, is thoroughly mixed for about 1 to 3 minutes in the gum base which at this time is in the form of a continuous mass. Thereafter, from about 10 to about 40% by weight of the total amount of sweetener-bulking agent, which preferably is fine granular sugar, is mixed for about 2 to about 10 minutes with the continuous mass of gum base and softener during which time the continuous mass breaks up into granules or chunks. The corn syrup solids are then mixed with the granules for about 4 to about 6 minutes and then the remaining sweetener-bulking agent and flavors are mixed with the above mixture for about 1 to about 3 minutes to form a fine granular aerated discontinuous mass. Finally, the liquid sorbitol is added to the discontinuous mass and mixed therewith for about 3 to about 6 minutes to form a cohesive, but still discontinuous mass. Thereafter, if desired, solid flavor may be added and mixed with the gum base mix to form a chewing gum which may then be rolled, scored, cut into desired shapes and wrapped without the chewing gum sticking to the wrap.

Preferred chewing gum compositions in accordance with the invention are set out below.

| Ingredient | Parts by Weight | | |
|---|---|---|---|
| Gum base | 13 | to | 32 |
| Softener (e.g. lecithin) | 0.1 | to | 1 |
| Corn syrup solids (D.E. 20-42) | 4 | to | 15 |
| Sugar (or other bulking agent) | 40 | to | 75 |
| Liquid flavor | 0.5 | to | 1.5 |
| Other plasticizer | 0.2 | to | 2 |
| Liquid sorbitol (65 to 75% solids) | 5 | to | 18 |
| Color | 0 | to | 0.5 |

The following Example illustrates a preferred embodiment of the present invention without, however, limiting the same thereto. All temperatures are expressed in °F.

EXAMPLE

Chewing gum having the following composition is prepared in accordance with the method of the invention as described below.

| Ingredient | Parts by Weight |
|---|---|
| Gum base | 19 |
| Lecithin | 1.5 |
| Sugar, pulverized | 48 |
| Corn syrup solids (D.E. 24) | 7.5 |
| Liquid sorbitol (70% solids) | 15 |
| Liquid flavor (fruit blend) | 1 |
| Spray dried flavor | 0.5 |
| Color | 0.05 |

The gum base is melted (160°-175° F.) and placed in a standard dough mixer equipped with sigma blades. Lecithin is added and mixed for 1 minute. About ⅓ of the sugar is added and mixed for 1 minute during which time the gum base breaks up into granules. The corn syrup solids are added to the granules and mixed therewith for 2 minutes during which time the gum base granules are further broken up into more granules. The remainder of the sugar and the liquid flavor are then mixed with the afore-described granules for about 2 minutes to form a fine granular aerated discontinuous mass. Thereafter, the liquid sorbitol liquid is mixed with the discontinuous mass for about 3 minutes to form a cohesive mass. Thereafter, the spray dried flavor is mixed into the mass to form a chewing gum which has a relatively hard consistency. The chewing gum mass is rolled, scored, cut into desired shape and then individually wrapped.

After about 12 hours, it is found that the wrappers do not stick to the chewing gum pieces and are easily removed. In addition, the unwrapped pieces of chewing gum are found to have a soft discontinuous consistency which provides an easy bite through and soft chew.

What is claimed is:

1. A chewing gum having a soft discontinuous texture and easy bite through comprising from about 8 to about 50% by weight of gum base, from about 2 to about 15% by weight corn syrup solids having a dextrose equivalent of from about 20 to about 95, one or more sweetener-bulking agents, and from about 5 to about 25% by weight of one or more liquid moisturizers which are less hygroscopic than the corn syrup solids and including liquid sorbitol, high fructose corn syrup, invert sugar, sugar syrup or water, or mixtures thereof, said liquid moisturizers being at least initially separated from the corn syrup solids, the chewing gum having an initially hard consistency which upon standing changes to a soft consistency as the liquid from the liquid moisturizer is absorbed by the corn syrup solids.

2. The chewing gum as defined in claim 1 wherein the liquid moisturizer is liquid sorbitol.

3. The chewing gum as defined in claim 2 wherein the liquid sorbitol is present in an amount of within the range of from about 5 to about 25% by weight of the chewing gum.

4. The chewing gum as defined in claim 1 wherein the sweetener-bulking agent is sugar.

5. The chewing gum as defined in claim 4 wherein the sugar is present in an amount of from about 40 to about 75% by weight of the chewing gum.

6. The chewing gum as defined in claim 1 further including softeners, flavor and optionally color.

7. The chewing gum as defined in claim 1 further including additional sweetener.

8. A method for preparing a chewing gum as defined in claim 1 including the steps of mixing melted gum base with from about 10 to about 40% by weight of the total amount of sweetener-bulking agent to cause the gum base to be broken up into discrete granules, mixing said granules with said corn syrup solids, adding and mixing the liquid moisturizer with the granular discontinuous mass to form a cohesive, but discontinuous, mass having a relatively hard consistency which after liquid from the moisturizer is absorbed by the corn syrup solids is converted to a soft discontinuous chewing gum having an easy bite through and soft chew.

9. The method as defined in claim 8 wherein said sweetener-bulking agent is sugar.

10. The method as defined in claim 8 wherein the liquid moisturizer is liquid sorbitol.

11. Chewing gum prepared by the process as defined in claim 8.

* * * * *